March 19, 1963  W. D. GILES  3,081,827
TRACTOR HITCH
Filed Oct. 19, 1955  3 Sheets-Sheet 1
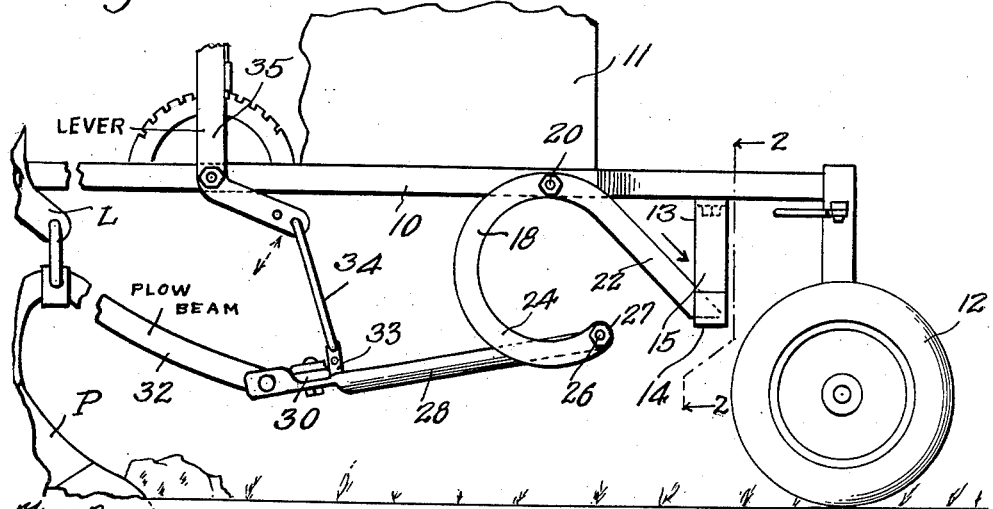
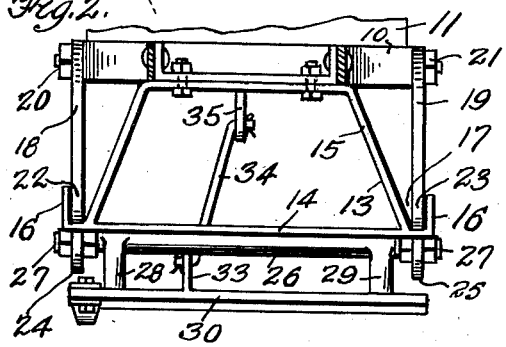
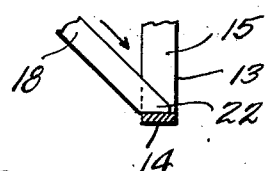
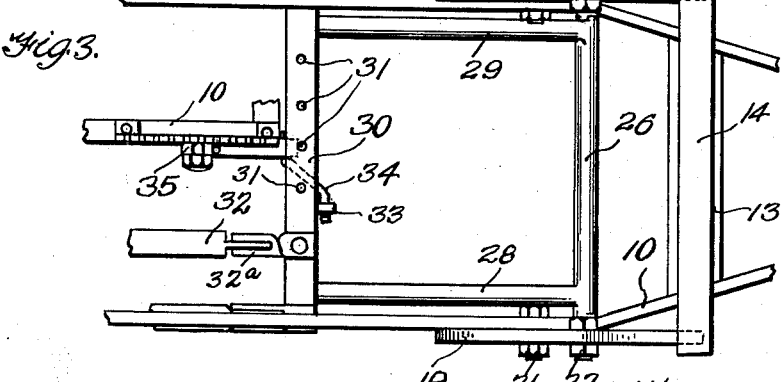
INVENTOR
WALTER D. GILES
BY
HIS ATTORNEY March 19, 1963     W. D. GILES     3,081,827
TRACTOR HITCH
Filed Oct. 19, 1955     3 Sheets-Sheet 2
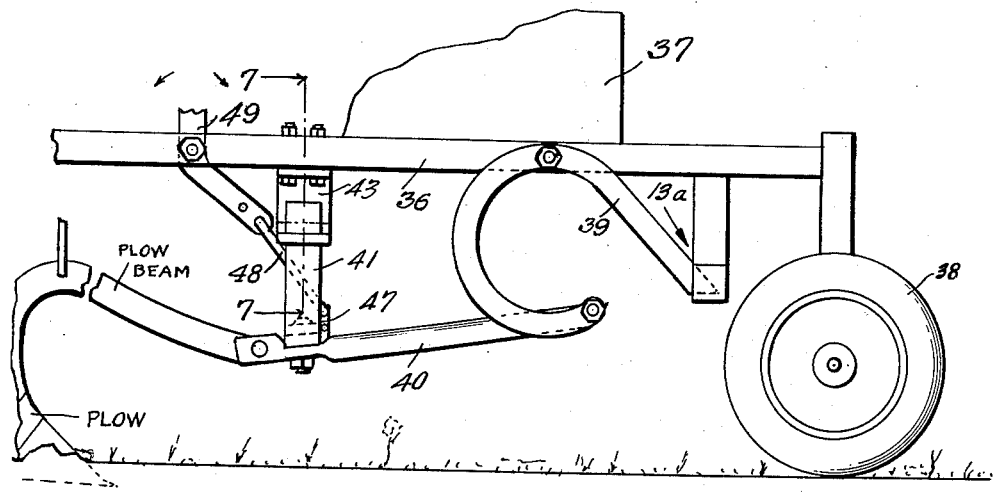
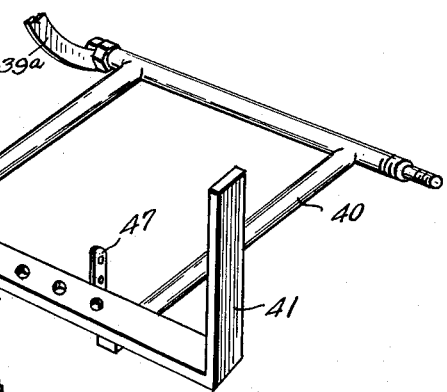
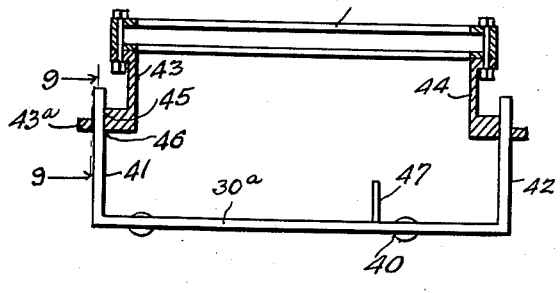
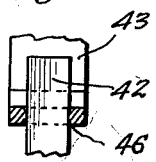
INVENTOR
WALTER D. GILES
BY *Irving A. McCathren*
HIS ATTORNEY

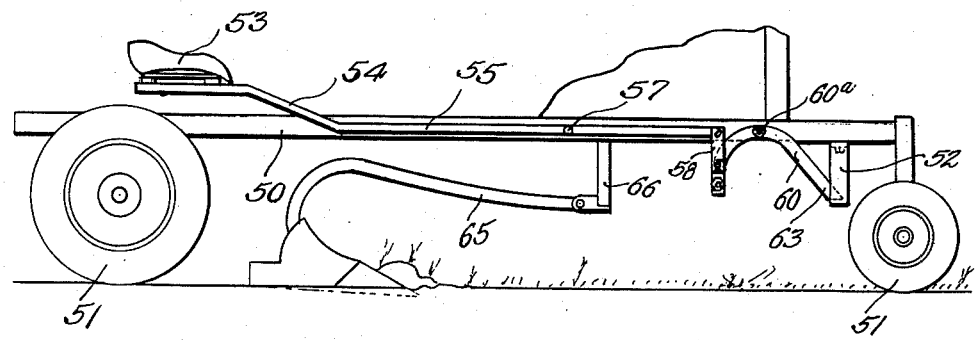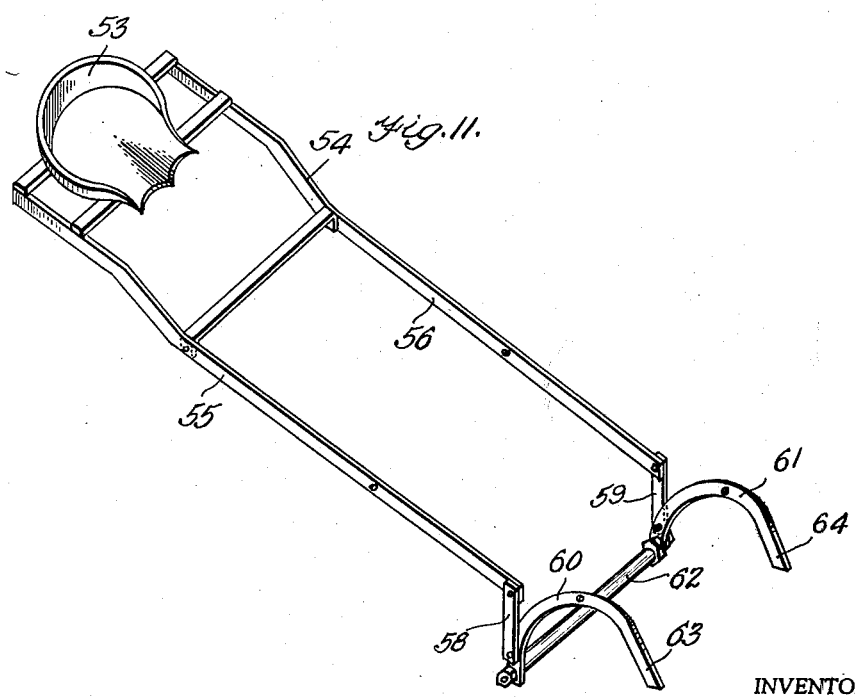

United States Patent Office 3,081,827
Patented Mar. 19, 1963

3,081,827
TRACTOR HITCH
Walter D. Giles, Paradis, La.
Filed Oct. 19, 1955, Ser. No. 541,413
9 Claims. (Cl. 172—677)

This invention relates to a tractor hitch, and has for one of its objects the production of a simple and efficient means for preventing the front end of a tractor from kicking up should a plow carried by the tractor strike a root or other obstruction.

Another object of this invention is the production of a simple and efficient means for exerting a downward pressure upon the saddle which is hung directly below the bottom of the engine frame of a tractor near the front of the tractor frame to prevent the front end of the tractor frame from kicking up in a manner to turn the tractor over.

Other objects and advantages of the present invention will appear throughout the following specification and claims.

In the drawings:

FIGURE 1 is a fragmentary side elevational view of a tractor frame showing my improved hitch;

FIGURE 2 is a vertical sectional view taken on line 2—2 of FIGURE 1;

FIGURE 3 is a fragmentary bottom plan view of a tractor frame illustrating the tractor hitch;

FIGURE 4 is a fragmentary sectional view through the saddle, showing the manner in which the pressure arcs engage the saddle;

FIGURE 5 is a fragmentary side elevational view of a tractor frame illustrating a modified form of a tractor hitch;

FIGURE 6 is a fragmentary perspective view of the plow beam connection between the pressure arcs and plow beam of the modified form shown in FIGURE 5;

FIGURE 7 is a vertical sectional view taken on line 7—7 of FIGURE 5, the plow hitch connection being shown in rear elevation with the plow beam removed;

FIGURE 8 is a perspective view of one of the hanger guides carried by the tractor frame;

FIGURE 9 is a sectional view taken on line 9—9 of FIGURE 7;

FIGURE 10 is a fragmentary side elevational view of a further modified form of tractor frame and showing the operator's seat control pressure actuating means;

FIGURE 11 is a perspective view of the operator's seat control pressure actuating means detached from the tractor frame.

By referring to the drawings in detail it will be seen that 10 designates a conventional tractor frame which carries a conventional light engine or motor 11. The front end of the frame is carried by the suitable front wheels such as the front wheel 12. A saddle 13 is hung from the frame 10 below the frame and motor as shown in FIGURE 1. This saddle 13 is provided with a base strip 14 and an upstanding yoke frame 15. The base strip is provided with upturned ends 16 defining a pocket 17 at each side of the saddle, as shown in FIGURE 2.

A pair of pressure arcs 18 and 19 are hung on the frame 10. The arc 18 is pivotally secured to the frame 10 by means of a pivot bolt 20, and the arc 19 is pivotally secured to the frame 10 by means of a bolt 21. The arc 18 is provided with a forwardly and downwardly extending pressure arm 22, the end of which rests in the pocket 17 on one side of the saddle 13. The arc 19 is provided with a similar forwardly and downwardly extending pressure arm 23 which rests in the pocket 17 on the opposite side of the saddle 13, as is shown in FIGURE 2. The arc 18 is also provided with a rear downwardly and forwardly curved arm 24. The arc 19 is similarly constructed and is a duplicate of the arc 18 and is provided with an arm 25 similar to the arm 24.

A transverse bar 26 of a plow beam connection is secured to the ends of the arms 24 and 25 of the arcs 18 and 19 by means of suitable connections 27 and a pair of spaced rearwardly extending parallel bars 28 and 29 are welded or otherwise attached to the transverse bar 26, as shown in FIGURES 2 and 3. A transverse hitch bar 30 is welded or otherwise secured to the rear ends of the bars 28 and 29 and extends substantially parallel to the bar 26. This bar 30 is provided with a plurality of perforations 31 to facilitate the connection of a selected number of plow beams, such as the plow beam 32 to the hitch bar 30. Any selected number of plow beams may be so attached. The transverse hitch bar 30 is provided with an upstanding lever attaching arm 33 which is preferably provided with a plurality of vertically aligned apertures to facilitate an adjustable connection with the operating link 34 of the operating lever 35. The lever 35 may be of the conventional type and may be mounted at any convenient place and in any desired manner upon the tractor frame 10.

It has been found that when plowing, discing or cultivating in heavy soil, the front end of a tractor frame is likely to kick up and cause the tractor to turn over unless some means is provided to avoid this difficulty. For instance, when plowing, if the plow hangs on or strikes a root, the front end of the tractor will kick up, turn over, or fall back on the driver unless the motor is stopped or the clutch is thrown in quickly. Where a light tractor having a small light engine is used, the front end of the tractor is very light. When starting off it is necessary to ease off very slowly in gear to prevent the front end from kicking up.

With my improvement, this hazard above mentioned is eliminated, since the operator may swing the lever 35 forwardly and thereby exert a rearward pulling pressure upon the hitch bar 30. This action will cause the arms 28 and 29 to exert a rearward pulling action upon the bar 26 and the arms 24 and 25. This action will force the pressure arms 22 and 23 to exert a downward pressure upon the yoke frame 15 and hold the forward end of the frame and forward wheels from kicking up.

It should be understood that the lever 35 raises and lowers the plow hitch by means of the link 34 which is attached to the arm 33 which in turn is carried by the hitch bar 30. This governs the depth of the plow P and supports the weight of the hitch. The rod 34 is approximately in a vertical position, or at a slight angle, as shown in FIGURE 1, but as the hitch is raised or lowered the rod 34 will be at a slight angle, depending upon the position of the lever 35. The upper aperture in the arm 33 when receiving the rod 34, gives a maximum depth for the plow, and the bottom aperture connection gives the minimum depth.

In operation, the plow beam 32 is attached to the transverse hitch bar 30, and when plowing the plow itself pulls backwardly upon the hitch. This applies the same or an equal amount of pressure in the saddle 15 which is bolted to the frame 10, thereby preventing the forward end of the tractor from kicking up or turning over. The pressure therefore is applied by the pull of the plow. Apertures 31 permit the plow to be attached at differently selected positions to facilitate the building-up of a row. The frame of the hitch comprising members 26, 28, 29 and 30 is raised and lowered by means of the lever 35, but the plow P is lifted from the rear of the tractor by means of the conventional lifting lever L, which is common to all types of plowing implements. The plow is first dropped in position to plow by means of the conventional lifting lever and the lever 35 is then set to obtain the desired depth, the plow beam 32 having first been fastened as shown in FIGURE 3. As the row builds up the position of the connection of the plow beam 32 is changed through the medium of the apertures 31 in the bar 30 and the flexible joint 32ª which permits the plow to raise and lower.

With the present invention, the motor may choke down or the wheels may spin, but the tractor will not kick up or turn over, because the harder the tractor pulls, the same amount of downward pressure is applied to the front of the tractor. Therefore, the operator need have no worry about obstacles or overloading since the mechanism automatically adjusts itself.

In FIGURES 5 to 9 inclusive, a modified form of the invention is shown wherein a tractor frame 36 carries an engine or motor 37, the front end of the frame 36 being supported by conventional wheels such as the wheel 38 shown in FIGURE 5. A saddle 13ª constructed similarly to the saddle 13, is hung from the forward end of the frame 36. Arcs 39 and 39ª are hung on each side of the frame 36 similar to the arcs 18 and 19 and engage the yoke frame 13ª in the same manner as that shown in FIGURES 1, 2, 3 and 4. A hitch connection 40 of the same general structure as that shown in FIGURE 3 is connected to the arcs 39 and 39ª, as shown in FIGURES 5 and 6. In the form shown in FIGURE 6, the hitch bar 30ª is provided with upturned end flanges 41 and 42 which are slidably mounted for vertical movement through the hangers 43 and 44, which are suspended from the frame 36 above the hitch bar 30ª. Each hanger is similarly constructed.

The hanger 43 is provided with a bottom right angular flange 43ª having a bearing shoulder 45 against which the end flange 41 is adapted to abut after passing through the aperture 46. The aperture is formed, as shown in FIGURE 9, to permit free movement of the flange 41 therethrough and to compensate for the angular adjustment of the hitch connection 40. In the form shown in FIGURES 5 to 9 inclusive, the hitch bar 30ª is provided with a lever attaching arm 47 which is connected to an operating link 48. This link 48 in turn is connected to the operating lever 49 which is similar to the lever 35.

By considering FIGURES 6 and 8, the flanges 41 and 42 by passing through the apertures 46 strengthen the hitch frame and hold it rigid, while permitting up and down movement as desired. This in turn will keep the plow, when attached to the hitch and plowing, from swinging from left to right and thereby guide the plow in a straight line.

In FIGURES 10 and 11 there is shown a still further modified form of the invention, wherein a frame 50 is shown supported by the conventional wheels 51. A saddle 52 similar to the saddle 13 is hung from the forward end of the frame 50. An operator's seat 53 is carried by the rear end of the second frame or seat supporting frame 54. This seat supporting frame 54 extends longitudinally of vehicle frame 50 and is an extension of parallel lever bars 55 and 56. These bars 55 and 56 are pivotally attached to the frame 50 in a manner shown at 57 in FIGURE 10. Links 58 and 59 are pivotally hung from the forward ends of the respective bars 55 and 56. These links are connected at their lower ends to the rear ends of the respective arcs 60 and 61 and the rear ends of these arcs 60 and 61 are connected to the transverse bar 62 to brace the arcs and hold them in spaced relation. These arcs also abut the side of the frame 50 near the forward end of the frame 50 and are braced thereby. The forward ends 63 and 64 of the respective arcs engage the saddle 52 in the same manner as set forth with respect to the arcs 18 and 19 and the saddle 13. The arcs 60 and 61 are pivoted to the frame 50 by means of the journal bolts such as the bolt 60ª, shown in FIGURE 10.

In the form shown in FIGURES 10 and 11, the weight of the operator upon the seat 53 will be transformed into downward pressure upon the saddle 52 at the front of the frame 50 through the seat supporting frame 54, the links 58 and 59, and the arcs 60 and 61. The plow 65 may be attached to the frame by means of a connection 66.

The form shown in FIGURES 10 and 11 is of advantage when the tractor is not working but the engine is running, since the weight is applied to the front end of the frame 50 to restrain bucking when starting or stopping. The arcs 60 and 61 are connected to the frame 50 and also to the seat supporting frame 54. When the operator is seated in the seat 53, weight is applied to the seat 53, thereby pulling upwardly on the links 58 and 59, the frame 54 being pivoted at 57. This in turn pulls upwardly on the rear ends of the arcs 60 and 61 thereby applying pressure to the saddle 52 from the forward ends 63 and 64 of the arcs 60 and 61. Since the leverage is longer from the fulcrum 57 to the seat 53 than it is from the fulcrum 57 to the links 58 and 59, the downward pressure of the arcs 60 and 61 upon the saddle 52 is greatly increased.

It should be understood that certain detail changes in the construction and arrangement of parts may be employed without departing from the spirit of the invention, so long as such changes fall within the scope of the appended claims.

Having described the invention, what is claimed as new is:

1. A hitch of the class described comprising a vehicle frame, front wheels supporting the forward end of said frame, a plow beam suspended below said frame, a plow carried by said plow beam, a pressure receiving means suspended below said vehicle frame near the forward end of said frame in close proximity to and rearwardly of said front wheels and forwardly of said plow and plow beam, a pressure applying means pivoted upon and suspended from said vehicle frame directly rearwardly of said pressure receiving means, and having means engaging said pressure receiving means, and means extending rearwardly of and connected to said pressure applying means for swinging said pressure applying means upon its pivot and thereby applying a downward pressure of said pressure applying means upon said pressure receiving means directly rearwardly of said front wheels to prevent said front wheels and the forward end of said vehicle frame from kicking up when said plow is subjected to resistance while plowing.

2. A hitch as defined in claim 1, wherein said pressure receiving means comprises a yoke frame hung from said vehicle frame.

3. A hitch as defined in claim 1, wherein said pressure applying means comprises a pressure arc pivotally hung on said vehicle frame, said pressure arc having a rear downwardly and forwardly curved arm and a forwardly and downwardly extending pressure arm constituting means engaging said pressure receiving means, and said means extending rearwardly of and connected to said pressure applying means being pivotally connected at its forward end to the extremity of said downwardly and forwardly curved arm.

4. A hitch as defined in claim 1, wherein said pressure applying means comprises a pressure arc pivotally hung on said vehicle frame, said pressure arc having a rear downwardly and forwardly curved arm and a forwardly and downwardly extending pressure arm constituting means engaging said pressure receiving means, said means extending rearwardly of and connected to said pressure applying means being pivotally connected at its forward end to the extremity of said downwardly and forwardly curved arm, and similarly constructed pressure arcs carried by each side of said vehicle frame.

5. A hitch as defined in claim 1, wherein means connects the forward end of said plow beam to the extremity of the downwardly and forwardly curved arm of said pressure arc.

6. A hitch as defined in claim 1, wherein a hitch bar is carried by said means extending rearwardly of and connected to said pressure applying means, and wherein said hitch bar is vertically and slidably adjustable relative to said vehicle frame.

7. A hitch as defined in claim 1, wherein said means extending rearwardly of and connected to said pressure applying means comprises a pair of longitudinally extending lever bars pivoted intermediate their ends, the forward ends of said lever bars being connected to said pressure applying means, and a weight receiving means carried by the rear ends of said lever bars to apply leverage pressure upon said pressure receiving means when a weight is applied to said weight receiving means.

8. A hitch as defined in claim 7, wherein the weight receiving means comprises an operator's seat.

9. A hitch of the class described comprising a vehicle frame, conventional supporting and propelling means for said frame, said supporting means including front wheels at the front end of said frame, a plow suspended below said frame rearwardly of said front wheels, said plow including a beam, a pressure member pivotally secured to said frame, said pressure member having a downwardly and forwardly extending portion suspended below said frame, said pressure member also having a forwardly and downwardly extending portion in advance of the first mentioned downwardly and forwardly extending portion, means connecting said beam to said first mentioned downwardly and forwardly extending portion, and pressure receiving means carried near the front end of said frame and suspended below said frame and receiving the second mentioned forwardly and downwardly extending portion for applying downward leverage pressure upon said pressure receiving means closely behind said front wheels when said plow is subjected to resistance while plowing to prevent said front wheels from kicking up.

References Cited in the file of this patent
UNITED STATES PATENTS

| | | |
|---|---|---|
| 2,319,670 | Ego | May 18, 1943 |
| 2,357,847 | Ray | Sept. 12, 1944 |
| 2,546,461 | Lewis | Mar. 27, 1951 |
| 2,611,302 | De Bairos | Sept. 23, 1952 |
| 2,672,802 | Bunting | Mar. 23, 1954 |
| 2,674,171 | Metz et al. | Apr. 6, 1954 |
| 2,686,465 | Silver et al. | Aug. 17, 1954 |
| 2,691,929 | Grimshaw | Oct. 19, 1954 |